United States Patent [19]

Yago

[11] 4,174,013
[45] Nov. 13, 1979

[54] MINE CAR

[75] Inventor: Jeffry R. Yago, Barboursville, W. Va.

[73] Assignee: Lester Construction Co., Hurricane, W. Va.

[21] Appl. No.: 904,296

[22] Filed: May 9, 1978

Related U.S. Application Data

[62] Division of Ser. No. 678,631, Apr. 20, 1976, Pat. No. 4,094,361.

[51] Int. Cl.² .............................................. B62D 11/12
[52] U.S. Cl. .................................... 180/6.2; 74/606 R
[58] Field of Search ......................... 180/6.5, 6.2, 6.28, 180/6.66, 6.7, 6.5 R; 310/88; 299/12; 74/606; 169/48

[56] References Cited

U.S. PATENT DOCUMENTS

| | | | |
|---|---|---|---|
| 1,312,828 | 8/1919 | Brantley | 180/6.7 |
| 1,488,629 | 4/1924 | Wick | 180/6.7 |
| 2,132,661 | 10/1938 | Temple | 180/6.66 |
| 2,465,436 | 3/1949 | Eckert | 310/88 |
| 2,714,826 | 8/1955 | Jasper | 180/6.66 X |
| 2,910,882 | 11/1959 | Wellauer | 74/606 |
| 2,976,945 | 3/1961 | Schreck | 180/6.5 R |

Primary Examiner—John A. Pekar
Attorney, Agent, or Firm—Gipple & Hale

[57] ABSTRACT

A fire safety transmission apparatus comprising an explosion-proof container, an adapter plate secured to the container, a cylindrical sleeve mounted to the adapter plate defining a central bore, allowing communication with the interior of the container. The sleeve bore is stepped, defining seats for a plurality of ball bearing races mounted therein. A rotatable stepped shaft having a diameter adapted to fit within the central bore rests on the ball bearing races. The shaft is connected to a motor mounted in the explosion-proof container with the spacing defined between the inner wall of the cylindrical sleeve and the outer surface of the freely rotating shaft being sized a predetermined tolerance for a predetermined length sufficient to prevent a flame from passing therethrough.

5 Claims, 8 Drawing Figures

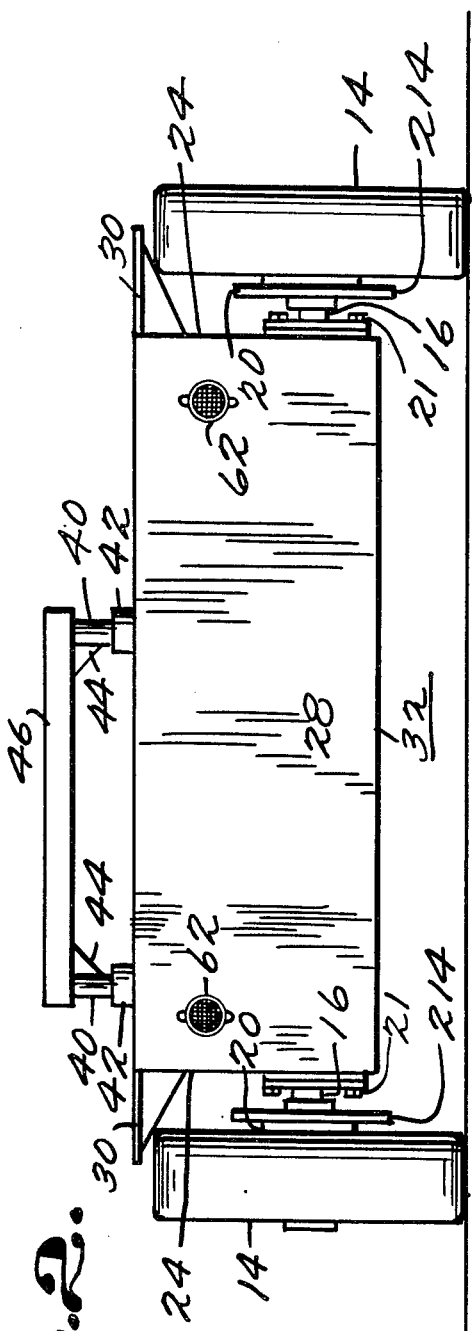
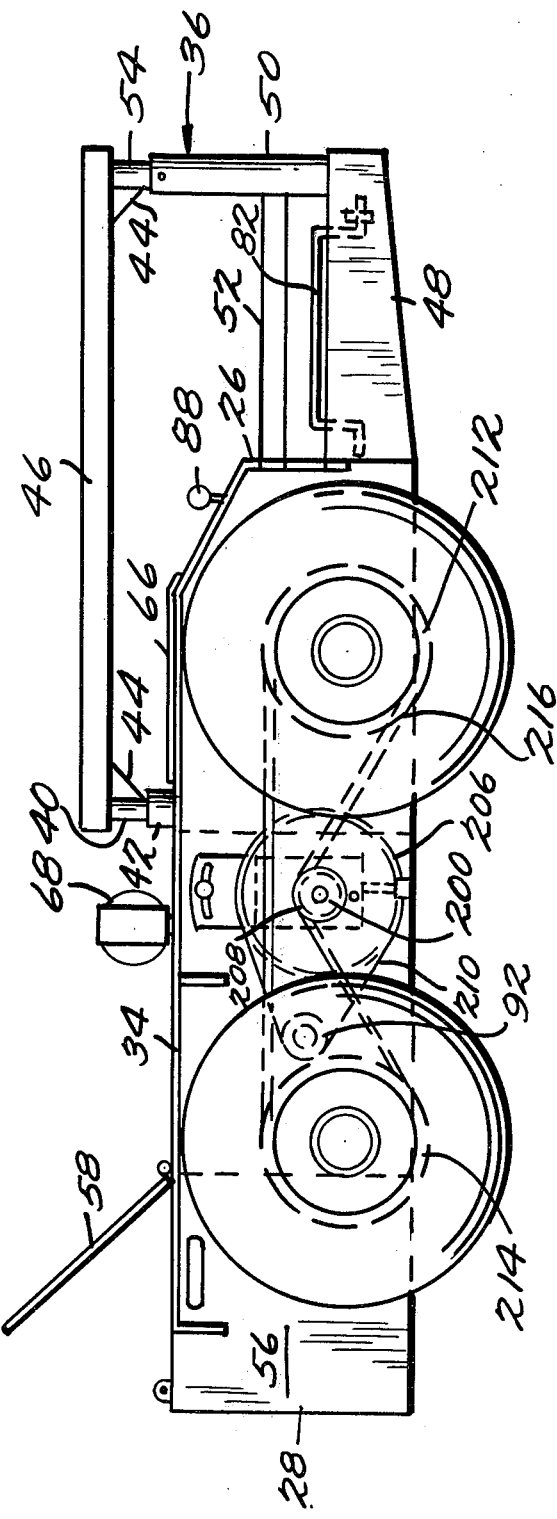

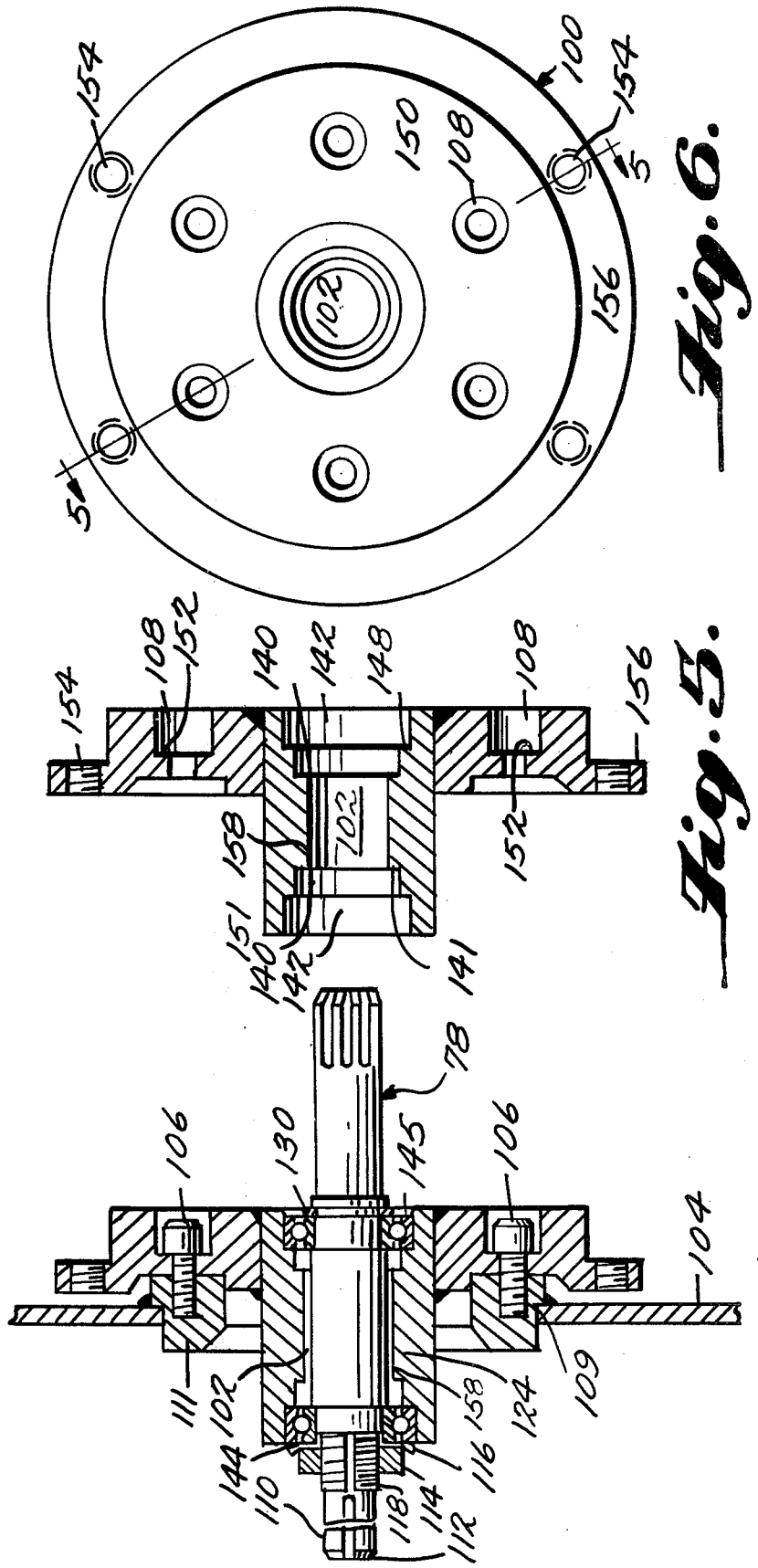

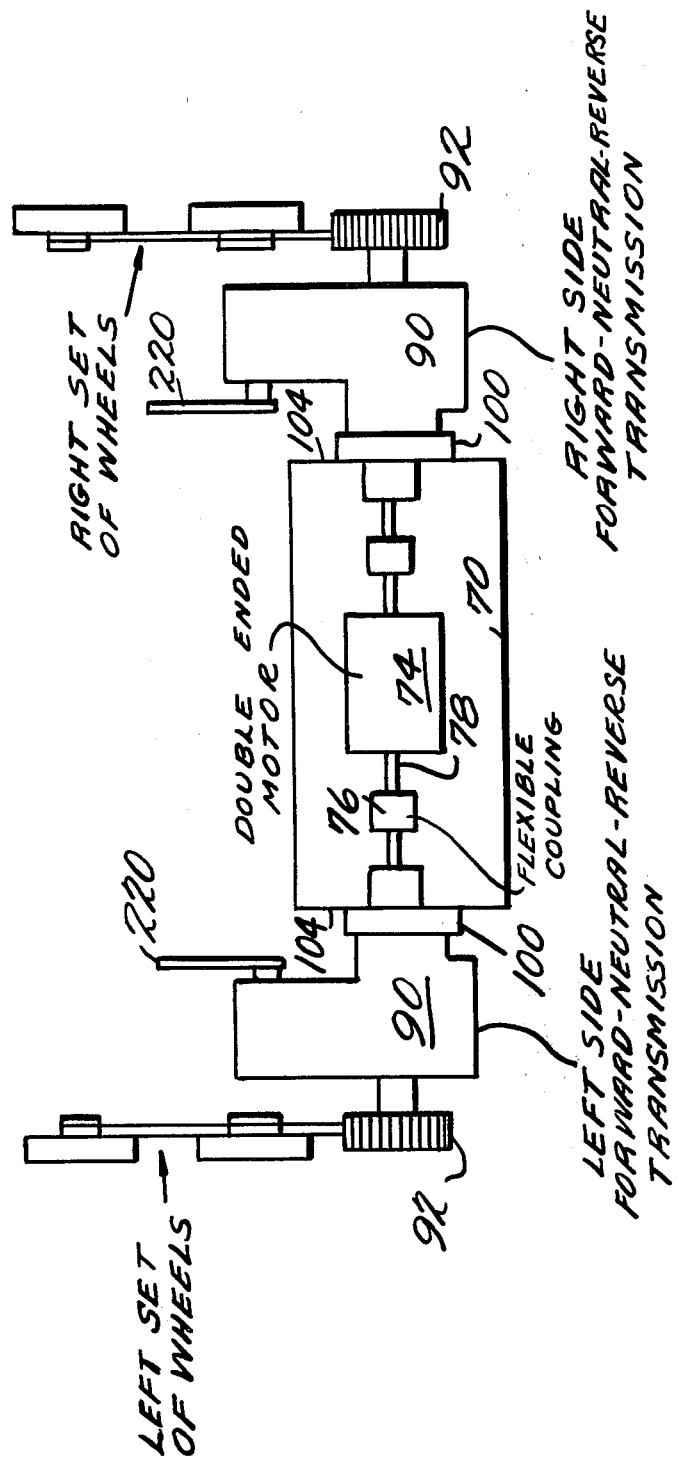

MINE CAR

This is a division of application Ser. No. 678,631 filed Apr. 20, 1976, now U.S. Pat. No. 4,094,361.

BACKGROUND OF THE INVENTION

The present invention generally relates to trucks, and more particularly to improvements in transport trucks for coal mining operations. More specifically, this invention relates to a safety apparatus for transmitting the torque produced by a motor from within an explosion-proof container to a suitable driving mechanism located exterior to the container. The invention provides a motor and associated exterior drive mechanism for a mining car constructed in such a manner that any sparks emitted by the motor or explosions occurring within the motor housing box will be contained and extinguished within the motor housing box thereby eliminating a primary cause of potential mine explosions.

In the process of extracting coal or any ore from the interior of a mine, it is customary and necessary for mining vehicles to be used. The vehicles are used for the transportation of individual miners, mining tools, and often used for the actual physical extraction of the coal or ore itself.

The mining car generally consists of a vehicle frame, front and rear axle, four wheels which are either constructed to move upon rails similar to those used for railroads or upon a flat road bed, a motor, a power source for the motor usually consisting of a series of batteries, and a gearing mechanism for transmitting the power of the motor to the wheels of the car.

Recently, the United States Bureau of Mines and in particular MESA has set strict safety requirements for all machinery used within mines. Specifically, MESA requires that all mining machinery that is used at or near the working and digging area be "Permissible" i.e., every electrical component, including motors, headlights, electrical motor starter, control switches, and all wiring must be housed in well designed steel boxes with special covers and wire guards.

These requirements were deemed necessary to insure that any sparking or short circuiting occurring within the steel boxes remained inside these enclosures and did not escape to the mine air which tends to be highly explosive.

Due to these strict governmental safety requirements, mining cars and machinery which are presently constructed are extremely complicated and expensive.

The simple and sturdy construction of the invention eliminates most of the complicated and expensive components now used in mining cars while still maintaining a self-propelled machine that is explosion-proof in accordance with the aforementioned safety standards.

The primary aspect of the invention provides an inexpensive "open" type motor inside an electrical starter control box. The necessary driving transmission is located on the outside wall of this control enclosure with a "permissible" drive shaft connecting the two.

Another aspect of the invention is to provide a starter motor transmission control package which may be added to stationary mining machinery to drive pumps, conveyors, loading machines and equipment which does not require complicated switching controls or large motors with resulting heat dissipation problems.

DESCRIPTION OF THE PRIOR ART

Transport trucks for coal mining are well known in the art.

U.S. Pat. Nos. 2,161,818, 1,725,081 and 1,694,780 all disclose particular improvements in transport trucks for coal mining machines.

The U.S. Pat. No. 2,161,818 patent has for one of its objects the use of an improved driving connection between the mining machine and the truck wheels.

Similarly, U.S. Pat. Nos. 1,725,081 and 1,694,780 contemplate as their main objectives the providing of a transport truck for a unitary mining machine with improved driving connections between the mining machine and the truck wheels.

Another patent of interest is U.S. Pat. No. 2,331,484 which relates to trucks for carrying mining machines, specifically cutting machines such as are used in coal mining, and also to the problem of carrying a dust-laying liquid medium such as water to the scene of operation of a mining machine, where it may be sprayed upon the operating cutter.

U.S. Pat. No. 1,539,841 also relates to a mining truck. More specifically the carriage frame forms a platform or compartment that serves to support the battery. The locomotive is provided with a motor which drives a pinion and a coacting gear wheel which is connected to the vehicle axle. The motor is supplied with electric current from batteries which are contained within a battery box which is located towards the rear of the carriage. Sprocket wheels, mounted upon the hub portions of the vehicle wheels are driven by chains which engage said sprocket wheels.

U.S. Pat. No. 2,753,002 clearly points out the problems encountered when a source of electricity is used in a mining operation. The use of overhead power lines in conjunction with contact brushes creates sparks which may tend to ignite the firedamp mixtures which collect in the upper and particularly the ceiling portions of the mining tunnels. The above mentioned patent tries to eliminate the explosion potential problem by conducting firedamp free fresh air which is originally located on the mine shaft bottom to the area immediately adjacent to the point where the formation of sparks may take place.

Another U.S. Pat. No. 2,863,512 teaches the use of a flame trap to confine the effects caused by an explosion of gases. The invention consists of a method of preventing the passage of a flame across a barrier, the barrier allowing the passage of gas yet causing the flame to give up heat at the barrier by vaporizing a substance.

U.S. Pat. No. 3,178,153 discloses a fire retarder and oil barrier. A double walled barrier prevents the entrance of heat or particles into an oil pump. A fire extinguisher material is held between the two walls and is automatically released when one of the walls is punctured. Additionally, it is specifically mentioned that an advantage of the double walled construction is that one wall may become extremely hot and still not adversely affect the oil adjacent the second wall because of the heat absorbing and dissipating properties of the space between the walls.

SUMMARY OF INVENTION

The present invention consists of a novel mining car and associated transmission mechanism. This invention utilizes a power transmittal shaft and associated adapter plate. The rotating shaft is connected on one end to a motor which is enclosed within an explosion-proof container. The other end of the rotating shaft is connected to suitable gearing means which in turn drives the wheels of a mining car. The novelty of the invention resides in providing an adapter plate through which the shaft passes, which allows the shaft to rotate unencumbered yet prevents any spark or explosion which occurs within the container from escaping to the mine's explosive atmosphere. The adapter plate is constructed such that the shaft passes through its central bore. The shaft is held in position by the construction of the adapter plate yet is able to be rotated freely by two ball bearing races located at both ends of the plate's central bore. The interior surface of the adapter plate is provided with a sealed locking ring which serves to secure the rotating shaft in the central bore of the adapter plate. The diameter of the adapter plate's central bore is critically only slightly greater than the diameter of the rotating shaft's freely rotating surface which passes through the bore. Additionally, the depth of the central bore, i.e., the thickness of the adapter plate along the flame path is of sufficient magnitude such that any spark or explosion occurring within the container will be snuffed out and extinguished due to a lack of an appreciable amount of a fire supporting gas being present in the central bore area. The central bore wall of the adapter plate is of a relatively large mass and therefore acts as a heat sink which tends to absorb much heat which may be emanating from within the container due to an explosion or fire occurring therewithin. This, too, tends to extinguish or substantially eliminate fires or sparks.

Although the invention will be set forth in the claims, the invention itself and the manner in which it may be made and used, may be better understood by referring to the following description taken in connection with the accompanying drawings forming a part thereof in which like reference numerals refer to like parts throughout the several views and in which:

BRIEF DESCRIPTION OF THE DRAWINGS

FIG. 2 is a rear elevational view of the mining car;

FIG. 3 is a side elevational view of the mining car;

FIG. 4 is an enlarged cross-sectional view of the rotating shaft adapter plate;

FIG. 5 is a cross-sectional view of the adapter plate taken along line 5'-5' of FIG. 6;

FIG. 6 is a front elevational view of the adapter plate;

FIG. 7 is a side elevational view of the rotating shaft; and

FIG. 8 is a front elevational view of the drive train in schematic diagram.

DETAILED DESCRIPTION OF THE DRAWINGS

Figure 1:
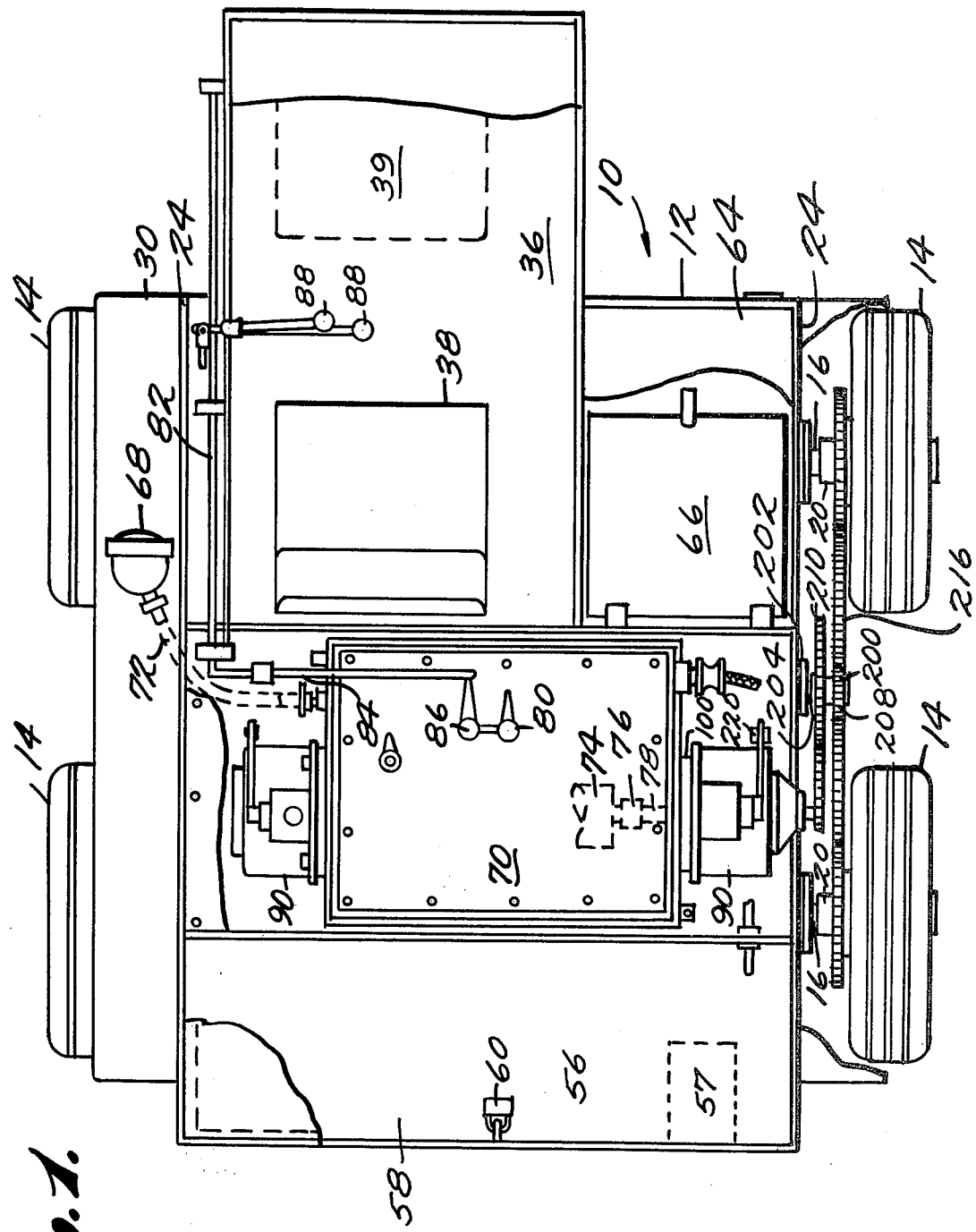
FIG. 1 is a top plan view partially in section of the mining car.

As best seen in the Figures, a mine car generally indicated as 10, is provided with a vehicle chassis 12 and wheels 14. Each of the wheels 14 is mounted on the ends of a stub axle 16. The wheels are preferably composed of solid rubber and placed around steel wheel hubs 20 of a standard size. The steel wheel hubs 20 are connected to the ends of the stub axle 16 by bearings and secured by a bolt, not shown. The opposite ends of the stub axles 16 i.e., those ends which do not have wheels mounted on their ends are bolted or welded in a conventional manner to the vehicle chassis by bolts 21. The wheels are able to freely rotate by conventional ball bearing means.

The vehicle chassis 12 is preferably constructed of a relatively thin sheet metal material. The vehicle chassis consists of two side walls 24 to which the axles 16 are mounted as previously described, a front wall 26 and a rear wall 28. The uppermost edge of the side walls extend outwardly to form wheel covering flanges 30. The flanges 30 serve to cover the top of the wheels in order to provide mud splash guards for said wheels. Additionally, the flanges prevent the operator from accidentally placing his hands or feet within close proximity to the moving gears, wheels and chains. The vehicle chassis is also provided with a bottom plate 32 and a top cover plate 34.

The forward section of the vehicle chassis 12 has an extended front section 36 which serves to provide a bottom support surface for an operator seat 38. The rear portion of the canopy section 46 is connected to the vehicle chassis by vertical supports 40. The vertical supports 40 are secured in place by sockets 42 which in turn are bolted or welded to the vehicle chassis. The upper ends of the vertical supports 40 are connected to the horizontal canopy 46 which provides the horizontal surface to protect the operator from falling rock. Canopy section 46 is braced and supported to the vertical supports by brace 44.

An extended trapezoidal-shaped section 48 forming a support for the extended front section 36 has its rear wall section secured to the front wall 26 of the vehicle chassis 12. The forward section of the extended trapezoidal-shaped section 48 provides a support surface for front support members 50. The front support members 50 are held in perpendicular relation to the top surface of section 48 by horizontal cross braces 52. The horizontal braces 52 are secured to the front wall 26 of the chassis and to the rear of the front support members 50. The upper portion of the front support members 50 are connected to and provide support for the horizontal canopy section 46 by forward vertical supports 54 mounted in sockets formed in the front support member 50. Additional braces 44 add strength to the connection between the canopy section 46 and the forward vertical supports 54.

The extended trapezoidal section 48 and the associated canopy section 46 are secured to the forward section of the vehicle chassis 12.

The right forward section of the vehicle chassis, the section adjacent to the operator seat 38, is provided with a storage box 64. The storage box 64 is provided with a hinged cover 66. An alternate seat location 39 (shown in phantom) may be placed at the forward portion of the front section 36.

The vehicle chassis is provided with head lights 68 which are bolted to the top cover plate 34. The head lights are powered by batteries 57 (only one of which is shown) which are contained within the battery case 56. The head lights 68 are connected to the explosive-proof box 70 by an insulated cable 72.

The rear portion of the vehicle chassis is provided with a battery case 56. The rear wall 28 of the vehicle chassis forms the rear wall of the battery case. A hinged cover 58 as shown in upright position in FIG. 3 is also provided for the battery case. Additionally, a conventional lock 60 may be used to insure that the batteries contained within the battery case can not be tampered with.

The batteries are connected to each other in a standard manner. The power of the batteries is transmitted to the explosion-proof box by "permissible" connectors. Additionally, the rear wall 28 is provided with two light reflectors 62.

An explosion-proof box 70 secured to the vehicle chassis is located behind the extended front section 36 and in front of the rear storage area 56. The explosive-proof box is made of heavy duty gauge steel or other suitable material and is constructed so as to withstand any relatively large explosive force which may occur within the interior of the box. The rear wall of the box 70 is located above the rear stub axle 16. A motor 74 is located and secured within the explosive-proof box. The preferred embodiment contemplates the utilization of a 5 H.P. motor to drive the car. Both sides of the motor are provided with flexible couplings 76 which serve to provide power from the motor 74 to a rotary shaft 78 as will be discussed in greater detail later in the specification.

The motor 74 is operated by a switch 80 located on the top exterior surface of the explosion-proof box. The switch 80 serves to operate the motor circuit breaker. The operator of the mine car can turn the motor on and off by moving the push rod 82 forwardly and rearwardly with respect to the mine car. The push rod 82 also serves as a "Panic-Bar" to shut off the motor if the operator is standing outside the machine and accidently moves the control levers 88. The push rod 82 located to the operator's left, along the side of the vehicle chassis, is directly connected to a connecting rod 84, which is in turn connected to a circuit breaker disconnect 86. In operation, should the operator desire to increase the speed of the mine car he can turn switch lever 80 in the proper direction to switch additional batteries into the motor circuit. This consequently changes the speed of the motor within the box. The converse is of course true should the operator desire to slow the vehicle down.

If an emergency should arise, whereby the operator desires to immediately stop the motion of the car, he can pull the push rod 82 rearwardly which in turn forces the connecting rod 84 to the right of the vehicle. This causes the circuit breaker 86 to disconnect the power from the motor and consequently the vehicle will immediately stop.

The right and left directional knobs 88 are located in front of the operator's seat 38 and each is connected to the right and left transmission 90, respectively. The left knob 88 controls the left transmission allowing the operator to drive the left set of wheels 14 forward-neutral or reverse. The right control knob 88 controls the right set of wheels 14 in a similar manner. Pushing both control knobs 88 forward causes the left and right set of wheels to move forwardly and consequently the car is driven forward. Conversely pulling back on control knobs 88 causes the car to be driven in reverse. Making turns is accomplished by moving one knob more than the other in the desired direction of the turn. Turning within the car's radius is accomplished by moving one control knob 88 to full forward and one to full reverse.

The mine car is provided with two explosion-proof driving mechanisms which prevents motor explosions from being transmitted from box 70 into the mine atmosphere.

The mechanism basically comprises a stepped rotating shaft 78, connecting the outside gearing assembly to the motor 74. The shaft 78 passes through the central bore 102 of the adapter plate 100. The adapter plate 100 is secured to the exterior of the side wall 104 of the explosion-proof box 70 by bolts 106 which pass through bolt holes 108 located circumferentially around the central bore 102 of the adapter plate 100. The adapter plate bolt holes 108 are aligned with corresponding blind bores 109 drilled in a circular flange member 111 which is welded to side wall 104.

The rotating shaft 78 as shown best in FIG. 7 is an elongated cylindrical shaft with a plurality of shoulders forming steps which act as stops to prevent relative lateral movement of the shaft. A keyed end 110 of the rotating shaft extends on one side of the side wall 104 inside the explosion-proof box 70. The keyed end 110 allows appropriate coupling 76 to be connected thereto so that the shaft can be rotated by the motor 74. The edge 112 of the keyed end is bevelled in order to facilitate the placing and removal of the coupling 76 and a lock nut 114 and washer 116 which holds the left hand bearing race 144 in position. The base of the secured end 110 defines a shoulder 120 which is perpendicular to the central rotating axis of the rotating shaft. Adjacent the shoulder 120 is a threaded section 118. The threaded section 118 provides the threads on which the washer 116 and lock nut 114 are attached and secured. A larger diameter stepped section is adjacent the threaded section of the rotating shaft forming the ball bearing contact surface portion 122.

A freely rotating surface portion 124 adjacent portion 122 comprises the portion of the rotating shaft 78 of greatest diameter. This surface is a considerable length in comparison to the rotating shaft's individual sections and in the preferred embodiment ranges from one to two inches in length with an optimum length of 1½ inches on a 9½ inch shaft. Adjacent to the freely rotating surface 124 and outside the container is formed another ball bearing contact surface 126 upon which right hand race 145 is mounted. It should be observed that the diameter of the ball bearing contact surface 126 is equal to the diameter of the ball bearing contact surface 122. Adjacent to the contact surface 126 and opposite the freely rotating surface 124 is the lock ring engaging groove 128. This lock ring engaging groove 128 serves to provide a cylindrical surface, around which a spirolox lock ring 130 is engaged. The lock ring 130 is mounted on the lock ring engaging groove 128 to secure race 145 and the rotating shaft 78 in a fixed horizontal relationship with respect to the adapter plate 100. The lock ring 130 does not restrict the rotary movement of the rotating shaft. A flange portion 132 of the shaft having a diameter slightly greater than the diameter of the lock ring engaging groove 128 is formed on the shaft to provide a shoulder stop 136 which prevents the lock ring 130 from horizontal relative displacement. The shaft terminates in toothed splined section 138 which ultimately is connected to suitable gearing in a conventionally known manner. In the preferred embodiment the splined section is a 16 teeth spline 20/30 pitch 30° P.A.

The adapter plate 100, as best seen in FIGS. 5 and 6, is a cylindrical machine tooled piece of heavy duty steel cadmium plate. The adapter plate consists of a face 150 and a cylindrical sleeve 151 which is welded to the face. The rotating shaft 78 is mounted axially within the adapter plate 100 in bore 102 and is held by two sealed bearing casings or races 144 and 145 which are located at the front and rear of the cylindrical sleeve 151. A central bore 102 passes through the center of the cylindrical sleeve. The diameter of the central bore 102 is machined to a degree of tolerance which while appearing small provides a relatively large machine tolerance, and is greater than the diameter of the freely rotating surface 124 of rotating shaft 78.

As an example of the tolerance available in the preferred embodiment surface 124 is machined to 1.180 inches with a zero plus tolerance and a 0.002 inch minus tolerance. Conversely the corresponding diameter of bore 102 is machined to 1.204 inches with a 0.002 inch plus tolerance and a zero minus tolerance. Thus it can be seen that the spacing between the bore and the shaft 78 assuming that the shaft is centered in the bore ranges from 0.024 inches to 0.028 inches or 0.012 to 0.014 inches when viewing the average spacing present between the bore surface and the shaft wall.

At both extreme ends of the central bore 102 are two annulus bores 142 in the cylindrical sleeve 151. The inner circumferential walls of the bores 142 provide ball bearing race retaining shoulders 148 for the two ball bearing races 144 and 145. The ball bearing races 144 and 145 are sealed races which provide ball bearing action to the ball bearing contact surfaces 122, 126 of the rotating shaft 78. The diameter of the bores 142 is of necessity equal to the size of the diameter of the ball bearing races 144 and 145. Intermediate annulus bores 140 are provided at both ends of the central bore 102 inside of bores 142. These bores define shoulders 141 which in combination with the races act as flame baffles or directors.

The adapter plate's face 150 has a plurality of bolt holes 108, circumferentially arranged about the central bore 102. These bolt holes have stop surfaces 152 which serve to prevent the heads of the securing bolts 106 from passing through the adapter plate's face 150. The machined fit of the adapter plate bolted to ring 111 by bolts 106 also meets "MESA" approved standards to contain any flames that may attempt to exit enclosure at this point. Bolt holes 154 are provided in the circumferential lip 156 to mount the transmission 90.

In operation, the keyed end 110 is connected through appropriate coupling 76 to the motor 74. A revolution of the keyed portion by the appropriate motor coupling 76 causes the entire rotating shaft 78 to rotate. A single rotation will therefore transmit the torque from the motor to the outside gearing assembly 90 and ultimately to the vehicle wheels 14. The shaft rotates freely due to the ball bearing races 144 and 145 acting upon the ball bearing contact surfaces 122, 126. The rotating shaft is held in relative horizontal position by washers 116, lock nut 114 and lock ring 130. It should be observed by viewing FIG. 4 and from the previous spacing discussions that there is a very small volume of air that exists in the area located between the adapter plate central bore wall 158 and the freely rotating surface 124 of the rotating shaft 78.

Should a motor spark ignite the gas within the explosion-proof box 70 and consequently cause a fire within the box then the fire or spark is extinguished by the adapter plate. The extinguishing of any spark or fire threat will prevent a mine explosion which might otherwise occur due to volatile gas being in close proximity in the mine shaft. The fire occurring within the explosion-proof box is extinguished by the exhaustion of any gas, acting as fuel, located within the box. The fire is prevented from escaping to the mine atmosphere by a combination of two effects, both effects being entirely due to the novel construction of the adapter plate and the rotating shaft.

Primarily, the fire will be prevented from escaping to the mine atmosphere because of the fact that the volume of gas being located between the rotating shaft and the central bore wall is extremely small and consequently a flame cannot be supported in that area called the flame path due to the lack of an appreciable amount of fuel in this critical flame path area. The length of the central bore wall and corresponding freely rotating surface are such as to enhance the effect of the adapter plate's extinguishing characteristic. That is, the longer the two surfaces are and the less space between the surfaces the harder it is for any flame or spark to jump the gap to the volatile mine atmosphere. Consequently, the fire will consume all the gas within the box and will ultimately die due to a lack of fuel.

Secondarily, the adapter plate serves as a heat sink which tends to absorb much of the heat occurring within the explosion-proof box. The cylindrical sleeve and adapter plate act as a heat sink due to their being constructed of a conductive metal. Consequently the constant withdrawal of heat retards the possibility of an explosion occurring in the mine atmosphere.

It should now be appreciated that a means to transmit the torque from a motor located within a container to an outside gearing mechanism is provided which nevertheless eliminates the possibility of an explosion or fire occurring within the enclosed motor container from spreading to the extremely volatile mine atmosphere.

The driving assembly is constructed by coupling transmission 90 to the outside splined end of the rotating shaft 78. A boss 200 is attached to the side wall 24 of the vehicle chassis 12 by support member 202 and cylindrical surface 204. The boss is constructed with internal ball bearings so as to allow the boss to freely rotate around the cylindrical surface. A large cylindrical gear 206 is attached to the boss at a point near to the vehicle chassis side wall 24. A smaller cylindrical gear 208 is also mounted on the fully rotating boss 200.

The smaller gear 208 is mounted on the boss at a point distal from the side wall of the vehicle chassis. An endless chain 210 is mounted over the gear 92 and the larger cylindrical gear 206 of boss 200. Gears 212 and 214 are located and attached to front and rear wheel hubs 18 respectively. A second endless chain 216 serves to transmit the rotary motion of the boss to the front and rear wheels. The endless chain 216 passes on top of the small gear 208 around gear 212 on the front steel wheel hub, directly across to the gear 214 of the rear steel wheel hub, and finally back to the top of the small gear 208 of the freely rotating boss 200.

When the motor is started, the rotating shaft 78 transmits the motor torque to the external gear 92. The chain 210 consequently transmits the torque to the rotating boss 200, by means of large gear 206. As large gear 206 and small gear 208 must move in tandem, as they are both secured to boss 200, the torque is transmitted to large gear 206 which causes small gear 208 to rotate. The second chain 216 carries the rotational energy of the small gear 208 to drive both the front and the rear wheels.

A forward-neutral-reverse control arm 220 allows the operator to selectively change the direction of the rotation of output gear 92 mounted on transmission 90.

It should be obvious that the motor coupling, transmission, adapter plate and rotating shaft, and outside gearing mechanism previously described are all provided on both sides of the mine car.

While the preferred embodiment of the invention has been disclosed, it is understood that the invention is not limited to such an embodiment since it may be otherwise embodied in the scope of the appended claims.

What is claimed is:

1. A mine car comprising a vehicle body, an explosion-proof container housing a motor mounted on said body, a plurality of wheels rotatably mounted to said body, drive means connecting said motor and extending through said explosion-proof container to a transmission on each side of said explosion-proof container, said vehicle body, explosion-proof container, wheels, drive means and transmissions presenting a low profile allowing use in mining operations with limited space, said transmissions being connected to said wheels mounted on said body adjacent to said transmissions, so that said wheels will be driven by said drive means through said transmissions, means for regulating the speed and direction of the vehicle, said speed and directional means comprising a plurality of mechanical speed and directional control members mounted on said mine car body, one of said speed and directional control members being connected to a transmission mounted on one side of the explosion-proof container and another of said speed and directional control members being connected to a transmission mounted on the opposite side of the explosion-proof container, each speed and directional control member controlling its respective connected transmission so that the wheels connected to the transmission can be driven in the selected mode chosen from a forward, neutral, reverse mode sequence independently of the mode selected for the other transmission, an electrical power source for providing power to said motor, and means for retarding flame occurring within the explosion-proof container and traveling along said drive means so that said flame is prevented from escaping to the atmosphere.

2. A mine car as claimed in claim 1 wherein the explosion-proof container houses both the drive motor and its electrical controls.

3. A mine car as claimed in claim 1 wherein the car has dual steering and drive means utilizing a single, non-reversing drive motor and operating by mechanical connection of said dual steering and drive means to said transmissions.

4. A mine car comprising a vehicle body, an explosion-proof container, a plurality of wheels rotatably mounted to said body, drive means extending through said explosion-proof container connecting each end of a double ended motor's drive shaft, respectively, to each of two transmissions, each of said transmissions being connected, respectively, to several of said wheels adjacent to said transmissions, means for controlling the speed and direction of the vehicle, said speed and directional control means comprising a plurality of speed and directional control members mounted on said mine car body, one of said speed and directional control members being connected to a transmission mounted on the right side of the explosion-proof container and another of said speed and directional control members being connected to a transmission mounted on the left side of the explosion-proof container, each speed and directional control member controlling its respective connected transmission so that the drive means connected to the transmission can be placed in the selected mode chosen from a forward, neutral, reverse mode sequence independently of the mode selected for the other transmission, a power source providing power to said motor and means for retarding flame occurring within the explosion-proof container positioned around a portion of said drive means, one for each transmission, adjacent said explosion-proof container so that flame is prevented from escaping into the atmosphere, the combination of said body, wheels, drive means, explosion-proof container and related members presenting a low profile which allows use of the car in mining operations having limited space.

5. A mine car comprising a vehicle body, an explosion-proof container mounted on said body, said explosion-proof container housing a motor, a plurality of wheels rotatably mounted to said body, drive means connecting said motor to said plurality of wheels, said drive means including a pair of first permissible assemblies, each of said first permissible assemblies being mounted, respectively to an explosion-proof container wall, each of said first permissible assemblies comprising an adapter plate which is secured to the explosion-proof container, said adapter plate having a central through-going stepped bore and shoulders defined at both ends of the central bore by said steps, said shoulders providing a seat for ball bearing races mounted therein and forming a flame baffle, a torque transmitting shaft mounted in and extending through said bore and said bearing races and adapted to rotate freely therein, the proximal end of said torque transmitting shaft being operatively engaged to a coupling means which couples said torque transmitting shaft to said motor, so that said torque transmitting shaft rotates when driven by said motor, transmission means mounted to said mine car outside of said explosion-proof container, said transmission means comprising a transmission assembly mounted to said explosion-proof container wall adjacent to said adapter plate, the distal end of said torque transmitting shaft being operatively engaged to said transmission assembly, a second drive portion of said drive means connecting said wheels to said transmission assembly so that said wheels can be driven by said transmission assembly, and means for controlling the speed and direction of the mine car, said speed and directional control means comprising a plurality of speed and directional control members movably mounted on said mine car body, one of said speed and direction control members being connected by a transmission assembly mounted on said mine car on the right hand side of said explosion-proof container and one of said speed and directional control members being connected to a transmission assembly mounted on a mine car on the left hand side of said explosion-proof container, each of said speed and directional control members controlling its respective transmission assembly so that those wheels connected to the transmission assembly can be placed in a selective drive mode chosen from a forward, neutral, reverse mode sequence independently of the mode selected for the other transmission assembly, and a power source mounted on said mine car, said power source being connected to said motor and adapted to operate said motor.

* * * * *